United States Patent
Shukla et al.

(10) Patent No.: US 9,465,589 B2
(45) Date of Patent: Oct. 11, 2016

(54) STATEFUL COMPONENT AUTHORING AND EXECUTION

(75) Inventors: Dharma Shukla, Sammamish, WA (US); Akash Jeevan Sagar, Redmond, WA (US); Nathan C. Talbert, Seattle, WA (US); Muthukaruppan Annamalai, Kirkland, WA (US); Robert B. Schmidt, Carlsbad, CA (US); Aditya Bhandarkar, Sammamish, WA (US); Asad Jawahar, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 13/080,369

(22) Filed: Apr. 5, 2011

(65) Prior Publication Data

US 2012/0260227 A1  Oct. 11, 2012

(51) Int. Cl.
*G06F 9/44* (2006.01)

(52) U.S. Cl.
CPC .. *G06F 8/35* (2013.01); *G06F 8/20* (2013.01)

(58) Field of Classification Search
None
See application file for complete search history.

(56) References Cited

U.S. PATENT DOCUMENTS

| | | | |
|---|---|---|---|
| 5,784,612 A | 7/1998 | Crane et al. | |
| 5,948,072 A | 9/1999 | Cink et al. | |
| 6,473,794 B1 | 10/2002 | Guheen et al. | |
| 6,535,975 B1 | 3/2003 | Thompson et al. | |
| 6,546,553 B1 | 4/2003 | Hunt | |
| 6,856,995 B1 | 2/2005 | Ibitayo et al. | |
| 6,907,395 B1 | 6/2005 | Hunt et al. | |
| 7,080,143 B2 | 7/2006 | Hunt et al. | |
| 7,162,509 B2 | 1/2007 | Brown et al. | |
| 7,181,731 B2 | 2/2007 | Pace et al. | |
| 7,302,634 B2 * | 11/2007 | Lucovsky et al. | 715/200 |
| 7,350,213 B2 | 3/2008 | Deutesfeld et al. | |
| 7,356,613 B2 | 4/2008 | Cuomo et al. | |
| 7,418,484 B2 | 8/2008 | Presley | |
| 7,448,022 B1 | 11/2008 | Ram et al. | |
| 7,451,435 B2 | 11/2008 | Hunt et al. | |
| 7,516,442 B2 | 4/2009 | Wu et al. | |
| 7,571,206 B2 | 8/2009 | Koning et al. | |
| 7,603,444 B2 | 10/2009 | Bullis | |
| 7,730,068 B2 * | 6/2010 | Sarnowicz et al. | 707/738 |
| 7,779,383 B2 | 8/2010 | Bornhoevd et al. | |
| 7,783,763 B2 | 8/2010 | Tuel | |
| 7,788,233 B1 | 8/2010 | Iyer et al. | |
| 7,788,674 B1 | 8/2010 | Siegenfeld | |
| 7,814,551 B2 | 10/2010 | Darweesh et al. | |
| 7,937,714 B2 | 5/2011 | Grigsby et al. | |

(Continued)

OTHER PUBLICATIONS

Microsoft Application Architecture Guide, 2nd Edition, published on Oct. 2009.*

(Continued)

*Primary Examiner* — Insun Kang
(74) *Attorney, Agent, or Firm* — Benjamin P. Tabor; Micky Minhas

(57) ABSTRACT

A method for of authoring and executing stateful components for a distributed application is disclosed. An application schema for the distributed application is declaratively defined and includes a plurality of distributed modules. Each module hosts a set of stateful components co-located in a physical tier of a distributed environment having logic to manipulate state. The runtime supports partitioning the stateful components. Control flow opaqueness of component logic is banished in each of the stateful components, which would otherwise occur if state was externalized.

25 Claims, 7 Drawing Sheets

(56) References Cited

U.S. PATENT DOCUMENTS

| | | | |
|---|---|---|---|
| 8,060,865 | B2 | 11/2011 | Kimmerly |
| 8,136,109 | B1* | 3/2012 | Birdeau et al. ............... 717/175 |
| 2002/0174268 | A1 | 11/2002 | Goward et al. |
| 2003/0051236 | A1 | 3/2003 | Pace et al. |
| 2003/0110044 | A1 | 6/2003 | Nix et al. |
| 2003/0131073 | A1* | 7/2003 | Lucovsky et al. ............ 709/219 |
| 2005/0021696 | A1 | 1/2005 | Hunt et al. |
| 2005/0076195 | A1* | 4/2005 | Fuller et al. ...................... 713/1 |
| 2005/0144226 | A1 | 6/2005 | Purewal |
| 2005/0262499 | A1 | 11/2005 | Read |
| 2005/0289524 | A1* | 12/2005 | McGinnes .................... 717/140 |
| 2006/0111880 | A1* | 5/2006 | Brown et al. ..................... 703/1 |
| 2006/0271341 | A1* | 11/2006 | Brown et al. ..................... 703/1 |
| 2007/0061779 | A1 | 3/2007 | Dowedeit et al. |
| 2007/0067366 | A1* | 3/2007 | Landis .......................... 707/205 |
| 2007/0073829 | A1 | 3/2007 | Volodarsky et al. |
| 2007/0156872 | A1* | 7/2007 | Stoyanova .................... 709/223 |
| 2007/0162904 | A1 | 7/2007 | Kimmerly |
| 2007/0165544 | A1 | 7/2007 | Zhang |
| 2007/0203944 | A1* | 8/2007 | Batra et al. ................. 707/104.1 |
| 2007/0226203 | A1* | 9/2007 | Adya et al. ........................ 707/4 |
| 2007/0233969 | A1 | 10/2007 | Shukla et al. |
| 2007/0294312 | A1* | 12/2007 | Seshadri et al. ............. 707/200 |
| 2008/0114829 | A1* | 5/2008 | Button et al. ................. 709/203 |
| 2008/0195726 | A1 | 8/2008 | Melby et al. |
| 2008/0256514 | A1 | 10/2008 | Shiflet |
| 2008/0262828 | A1 | 10/2008 | Och et al. |
| 2009/0007093 | A1 | 1/2009 | Lin |
| 2009/0113451 | A1 | 4/2009 | Grigsby et al. |
| 2009/0199213 | A1 | 8/2009 | Webster et al. |
| 2009/0248693 | A1 | 10/2009 | Sagar et al. |
| 2009/0249310 | A1* | 10/2009 | Meijer et al. ................. 717/136 |
| 2010/0057787 | A1 | 3/2010 | Gnech et al. |
| 2010/0153955 | A1 | 6/2010 | Sirota et al. |
| 2010/0318975 | A1* | 12/2010 | Gustafsson et al. .......... 717/137 |
| 2012/0159424 | A1 | 6/2012 | Shukla et al. |
| 2012/0159425 | A1 | 6/2012 | Shukla et al. |
| 2012/0222003 | A1 | 8/2012 | Shukla et al. |
| 2012/0246613 | A1 | 9/2012 | Shukla et al. |
| 2012/0254109 | A1 | 10/2012 | Shukla et al. |

OTHER PUBLICATIONS

Skonnard, "Building Distributed Applications With .NET Services," MSDN Magzine, Apr. 2009.*

Milner, Updated to release: Apr. 2010A Developer's Introduction to Windows Workflow Foundation (WF) in .NET 4, Pluralsight Nov. 2009.*

Volodarsky, Michael. "Fast, Scalable, and Secure Session State Management for Your Web Applications", Retrieved at <<http://msdn.microsoft.com/en-us/magazine/cc163730.aspx?wa=wsignin1.0>>, Sep. 2005, pp. 12.

"Physical Tiers and Deployment", Retrieved at <<http://msdn.microsoft.com/en-us/library/ee658120.aspx>>, Retrieved Date; Nov. 24, 2010, pp. 17.

Brown, Simon, "Scalability Principles", Retrieved at <<http://www.infoq.com/articles/scalability-principles>>, May 21, 2008, pp. 4.

"What is new in VMWare's vFabric GemFire 6.5?", Retrieved at <<http://jagslog.blogspot.com/2010/10/what-is-new-in-vmware-vfabric-gemfire.html>>, Oct. 7, 2010, pp. 9.

Urquhart, James, "Application packaging for cloud computing: A proposal," Retrieved at << http://news.cnet.com/8301-19413_3-10422517-240.html >>, Jan. 2, 2010, pp. 4.

Peltzer, Dwight, "IBM's WebSphere Application Server vs. Microsoft's .NET Framework," Retrieved at << http://websphere.sys-con.com/node/45007 >>, May 26, 2004, pp. 4.

Pattison, Ted, "Visual Basic .NET: New Programming Model and Language Enhancements Boost Development Power," Retrieved at << http://msdn.microsoft.com/en-us/magazine/cc302016.aspx >>, Feb. 2001, pp. 9.

The Office Action for U.S. Appl. No. 12/975,127 mailed Jul. 16, 2013 (16 pgs.).

Galán, F., et al., Service Specification in Cloud Environments based on Extensions to Open Standards, Proceedings of the Fourth International ICST Conference on Communication System Software and Middleware, Jun. 16-19, 2009, 12 pages [retrieved on Jul. 3, 2013], Retrieved from the Internet: <URL:http://dl.acm.org/>.

The Final Office Action for U.S. Appl. No. 12/975,127 mailed Oct. 9, 2013 (16 pgs).

The Office Action for U.S. Appl. No. 12/975,127 mailed Jul. 30, 2014 (14 pgs).

The Final Office Action for U.S. Appl. No. 12/975,127 mailed Dec. 31, 2014 (14 pgs).

The Office Action for U.S. Appl. No. 12/975,127 mailed May 13, 2015 (16 pgs).

Bellissard, et al., "Distributed Application Configuration", Retrieved at << http://sardes.inrialpes.fr/~boyer/research/publications-web/96-Olan-ICDCS.pdf >>, Proceedings of the 16th International Conference on Distributed Computing Systems, 1996, pp. 7.

Rasche, et al., "ReDAC—Dynamic Reconfiguration of distributed component-based applications", Retrieved at << http://www.dcl.hpi.uni-potsdam.de/papers/papers/rasche_isorc08.pdf >>, Proceedings of the 11th IEEE Symposium on Object Oriented Real-Time Distributed Computing, 2008, p. 1-9.

Thalauer, Stefan, "Aspects of Interrelations in Distributed Component Systems", Retrieved at << http://www.iicm.tu-graz.ac.at/thesis/sthalauer.pdf >>, May 2004, pp. 85.

Soley, Richard, "Model-driven architecture targets middleware interoperability challenges", Retrieved at << http://www.ibm.com/developerworks/rational/library/403.html >>, Jul. 15, 2003, pp. 7.

The Office Action for U.S. Appl. No. 13/037,299 mailed Feb. 10, 2014 (16 pgs.).

The Final Office Action for U.S. Appl. No. 13/037,299 mailed May 21, 2014 (14 pgs.).

The Office Action for U.S. Appl. No. 13/037,299 mailed Aug. 27, 2014 (14 pgs.).

The Final Office Action for U.S. Appl. No. 13/037,299 mailed Jan. 2, 2015 (15 pgs.).

The Notice of Allowance for U.S. Appl. No. 13/037,299 mailed Apr. 13, 2015 (5 pgs.).

Thota, Chandu, "Use Web Services Provisioning to Control Access, Usage, and Billing on Your Site", Retrieved at << http://msdn.microsoft.com/en-us/magazine/cc188902.aspx >>, Dec. 2002, pp. 14.

"Distributed Component Models", Retrieved at << http://java.sun.com/developer/Books/jdbc/ch08.pdf >>, Retrieved Date: Nov. 25, 2010, p. 146-182.

The Office Action for U.S. Appl. No. 13/071,982 mailed Apr. 15, 2013 (21 pgs.).

The Final Office Action for U.S. Appl. No. 13/071,982 mailed Sep. 27, 2013 (23 pgs.).

The Office Action for U.S. Appl. No. 13/071,982 mailed Feb. 13, 2014 (22 pgs.).

The Final Office Action for U.S. Appl. No. 13/071,982 mailed Jun. 13, 2014 (24 pgs.).

The Office Action for U.S. Appl. No. 13/071,982 mailed 5/8/15 (23 pgs.).

Hong, et al., "Software Component Composition based on ADL and Middleware", Retrieved at<< http://pages.cs.wisc.edu/~chang/papers/SciChina01__ABC.pdf>>,vol. 44 No. 2, Apr. 2001,pp. 16.

Lagaisse, et al., "True and Transparent Distributed Composition of Aspect-Components", Retrieved at<<http://people.cs.kuleuven.be/~bert.lagaisse/papers/lagaisse.middleware06.pdf>>,2006, pp. 20.

Yau, et al., "A Component-Based Approach to Object-Oriented Distributed Application Software Development", Retrieved at<<http://ieeexplore.ieee.org/stamp/stamp.jsp?arnumber=00716662>>,pp. 6.

Sahai, et al., "A Data Model Based on Service and Process Abstractions for Management of Systems", Retrieved at<<http://www.hpl.hp.com/techreports/2002/HPL-2002-190.pdf<<,Jul. 9, 2002, pp. 17.

Yau, et al., "Component Customization for Object-Oriented Distributed Real-Time Software Development", Retrieved at<<http://www.computer.org/portal/web/csdl/doi/10.1109/ISORC.2000.839523>>,Mar. 2000,pp. 8.

(56) References Cited

OTHER PUBLICATIONS

The Office Action for U.S. Appl. No. 13/073,398 mailed Mar. 27, 2013 (29 pgs.).
The Final Office Action for U.S. Appl. No. 13/073,398 mailed Jul. 18, 2013 (31 pgs.).
The Office Action for U.S. Appl. No. 13/073,398 mailed Jun. 17, 2014 (30 pgs.).
The Final Office Action for U.S. Appl. No. 13/073,398 mailed Nov. 13, 2014 (32 pgs.).
The Office Action for U.S. Appl. No. 13/073,398 mailed Mar. 26, 2015 (32 pgs.).
IBM, "Service Component Model Based Runtime," IP.com, 2007 5 pgs.
Notice of Allowability for U.S. Appl. No. 13/037,299 mailed Oct. 22, 2015 (6 pgs.).
Notice of Allowance for U.S. Appl. No. 13/037,299 mailed Nov. 5, 2015 (13 pgs.).
From Wikipedia, the Free Encyclopedia (redirected from Platform as a Service), "Cloud Computing," pp. 1-7 (Retrieved Dec. 16, 2015) <<https://web.archive.org/web/20100228202033/http://en.wikipedia.org/wiki/Plafform_as_a_service#Platform>>.
Final Office Action for U.S. Appl. No. 13/071,982 mailed Nov. 4, 2015 (42 pgs.).
Final Office Action for U.S. Appl. No. 13/073,398 mailed Jul. 30, 2015 (44 pgs.).
Office Action for U.S. Appl. No. 13/073,398 mailed Nov. 19, 2015 (35 pgs.).
Final Office Action for U.S. Appl. No. 12/975,127 mailed Sep. 16, 2015 (34 pgs.).
Notice of Allowance for U.S. Appl. No. 13/037,299 mailed Jul. 17, 2015 (21 pgs.).
Yau, et al., "A Component-Based Approach to Object-Oriented Distributed Application Software Development", Retrieved at <<http://ieeexplore.ieee.org/stamp/stamp.jsp?arnumber=00716662>>,pp. 6 (Aug. 19-21, 1998).
Office Action for U.S. Appl. No. 12/975,127 mailed Apr. 22, 2016 (18 pgs.).
Final Office Action for U.S. Appl. No. 13/073,398 mailed Mar. 15, 2016 (41 pgs.).

\* cited by examiner

STATEFUL COMPONENT AUTHORING AND EXECUTION

BACKGROUND

Distributed computing applications are often deployed into environments having a multitude of different technologies and services that are used to form building blocks of the applications. Examples of distributed applications are legion and can include enterprise applications such as line of business or LOB, billing systems, customer relationship management or CRM, enterprise resource planning or ERP, business intelligence, human resource management, manufacturing, inventory control applications, and others. Such applications include components that are typically distributed across tiers in a computer network. Also, some applications are intended to run in a cloud computing environment, others are intended to run on the premises of the entity or user, and others are intended to span these environments. Further, the environment may change as an application evolves, the number of users change, or the locations of the users become dispersed.

One desirable characteristic of a distributed application is its ability to scale, or to cost-effectively change with the enterprise. Existing program models do not aim to support the development of scalable distributed applications. Typical component models are designed for desktop applications and are tier and technology specific. A distributed application is typically comprised of a set of distinct components, spread across tiers, which interact to perform work. While the components are virtualized, the relationship between the components is not. A physical wiring of components during runtime interaction is typically statically determined or otherwise hard-coded in this framework, which can place limits on the ways in which the application can be scaled or even on the application's overall ability to scale. While working with such models, many developers try to avoid writing stateful components because they are difficult to scale, but in making this choice the developer sacrifices benefits of other approaches, such as the natural expression of application logic.

Current techniques of state partitioning and replication are limited to high-end developers and are implemented by technologies of databases and distributed caches. Furthermore, current program models stich together components into composites in an ad hoc manner, which results in poorly scalable applications. There is no program model, however, that makes these techniques and technologies approachable and mainstream for developers to use in writing and scaling application state logic.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to an extensible framework that supports the authoring and execution of highly scalable and available stateful components. In one example, the extensible framework can be built on another framework. Stateful components co-locate state with logic that manipulates that state. Because the state accessed by the logic is local, the latency of data access is reduced, i.e. improved, as compared to a solution where the state is remote. Additionally, the logic of the component can be expressed more naturally and succinctly than if the state were externalized. A distributed component model and distributed composition runtime provide general-purpose support for component partitioning and replication techniques, which achieve high scalability and availability.

In one example, the disclosure is directed to a method for of authoring and executing stateful components for a distributed application. An application schema for the distributed application is declaratively defined and includes a plurality of distributed modules. Each module hosts a set of stateful components co-located in a physical tier of a distributed environment having logic to manipulate state. Runtime supports partitioning the stateful components. Control flow opaqueness of component logic is banished in each of the stateful components, which would otherwise occur if state was externalized.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
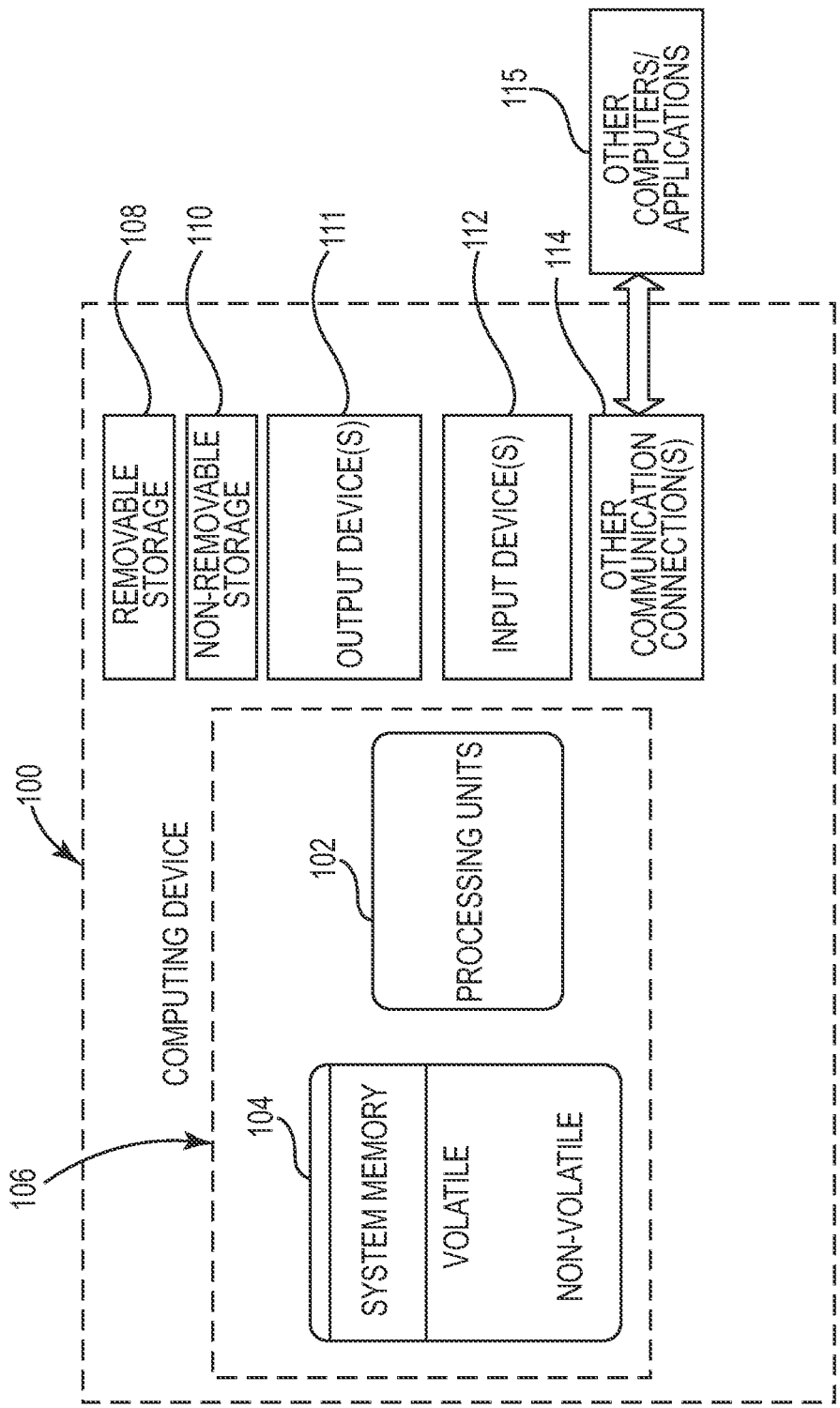
FIG. 1 is a block diagram illustrating an example computing device for running, hosting, or developing one or parts of a distributed application.

FIG. 1 illustrates an exemplary computer system that can be employed in an operating environment such as a distributed computing system or other form of computer network and used to host or run a distributed application included on one or more computer readable storage mediums storing computer executable instructions for controlling a computing device or distributed computing system to perform a method. The computer system can also be used to develop the distributed application and/or provide a node in a distributed application framework.

The exemplary computer system includes a computing device, such as computing device 100. In a basic configuration, computing device 100 typically includes a processor system having one or more processing units, i.e., processors 102, and memory 104. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. Typically, the managed environment includes pre-coded solutions to common programming problems to aid software developers to create applications, such as software programs, to run in the managed environment. An example of a managed environment can include an application framework sold under the trade designation .NET Framework available from Microsoft, Inc. of Redmond, Wash. U.S.A.

Figure 2:
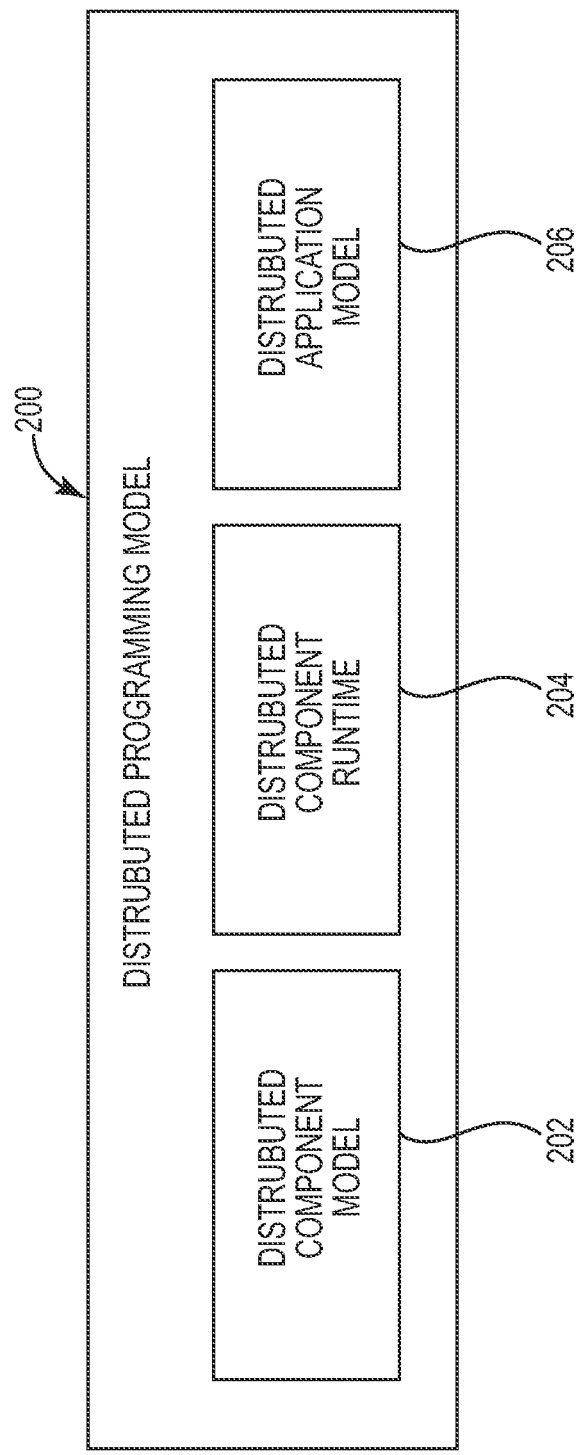
FIG. 2 is a block diagram illustrating a distributed application programming model including a distributed component model, a distributed component runtime, and a distributed application model.

FIG. 2 illustrates a block diagram of a distributed programming model 200 that can be used to develop an extensible distributed application on one or more computing devices 100 and/or used to deploy the distributed application on a plurality of computing devices 100 across a plurality of tiers. In one example, the distributed programming model can be built on another framework, such as the application framework sold under the trade designation .NET Framework. The distributed programming model presents an example of a framework suitable for incorporating the features of stateful component authoring and execution described below.

The programming model 200 includes a distributed component model 202, a distributed component runtime 204, and a distributed application model 206. The distributed component model 202 includes an extensible component abstraction that is technology and tier neutral and is consistent across cloud and premise environments. The distributed component model 202 provides support for stateless and stateful components, and provides for cloning, partitioning, and replication techniques used to scale the distributed application. The distributed component runtime 204 includes a distributed composition engine that virtualizes the component and inter-component interactions to shield code of the distributed application from disruptions caused by scaling out the application with cloning, partitioning, and replication strategies. In one example, the composition engine is lightweight and rehostable. The distributed composition runtime 204 brokers component interactions and also shields the distributed application from logical to physical address resolution and partition-aware routing. The distributed application model 206 provides a way to describe the distributed application components and the relationships between the components. In one example, the distributed application model 206 can include an application manifest and artifacts that can be serialized or presented in a graphic visualization within an integrated development environment, or IDE.

Figure 3:
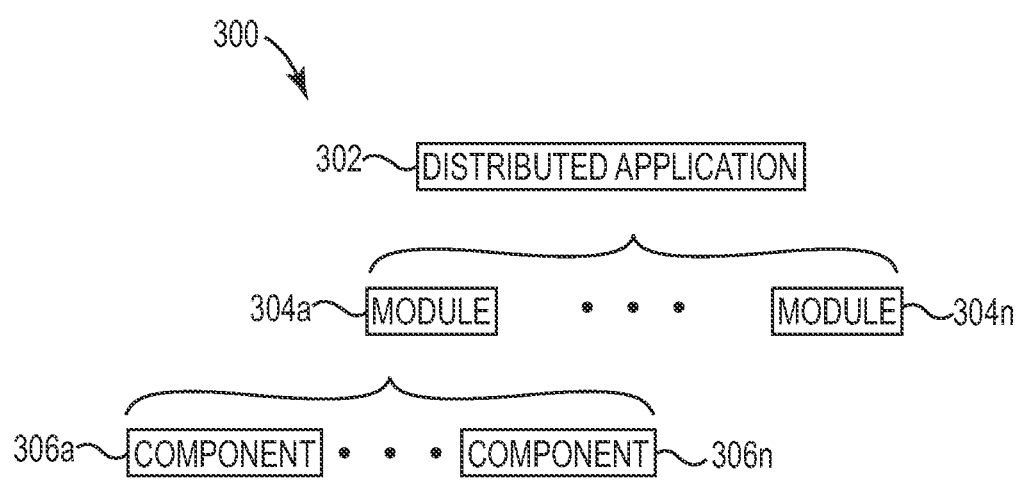
FIG. 3 is a block diagram illustrating a example schema of a distributed application according to the distributed component model of FIG. 2.

FIG. 3 illustrates a schema 300 for a distributed application 302. The schema 300 generally describes the distributed application 302 constructed according to a distributed component model in an application framework. The distributed component model 202 defines the schema 300 in abstractions including application, module, and component. The distributed application 302 includes one or more modules 304a-304n, and each module 304a-304n includes one or more components 306a-306n. Each component 306a-306n can specify imports and exports and includes metadata and artifacts. Application 302 is hosted in an application fabric that, in one example, provides the capabilities to deploy, run, and manage distributed applications that are long running, stateful, and allow high availability and elastic scale. At runtime (also referred to as execution time), the application framework provides the connections between the components 306a-306n of the application 302, described logically in the distributed component model.

The distributed application 302 has an identity and is a unit of deployment and management in the application fabric. When deployed, the application 302 spans tiers in the environment. Examples of tiers can include a client tier in many forms; a web tier, which is typically stateless, that can be available all of the time; a worker tier, including stateless and stateful components, that provides much of the logic of the application 302; and a storage tier that can be located on premises, in the cloud environment, or in a combination of the two. (Stateless can include abstractions that have no state or externalize state.) In one example, the application 302 is deployed to application fabric host farms. Physically, the application includes a package containing an application manifest that describes the compositional structure of the application, implementation details, configuration, and application artifacts. The application 302 in the example also corresponds to a tenant in the distributed component model and can include tenants of its own. This provides a layered and extensible tenant model that can be used for billing, throttling, metering, and the like.

Modules 304a-304n are a logical grouping of one or more components 306a-306n. For example, modules 304a-304n are each a tier-specific unit of hosting, which includes aspects of activation, scalability, availability, and isolation. Components 306a-306n in module 304a are deployed to the same host or single process and are typically co-located in the execution environment. The components 306a-306n often leverage the co-location for data affinity or the like.

In one example, each module is a tier-specific unit of hosting. Each module 306a-306n can have an associate role such as a worker in a worker module or web in a web module. Several types of modules can exist in the distributed component model, and the module types correspond to the capabilities of the hosting environment. Such module types can include browser, Web, stateless, stateful, and storage. The browser module can be hosted in a Web browser. The Web module is hosted on web hosts. A stateless module can include stateless components on modules capable of hosting stateless components, such as worker role or an application fabric role. A stateful module includes stateless components and can be hosted in a fabric-aware host. The storage module can be hosted on storage servers such as, for example, SQL (structured query language) database servers.

The modules 304a-304n can also include cross-cutting aspects, which include aspects and filters to lift cross cutting concerns such as logging, throttling, and metering, and the like out of the application logic. In the distributed component model, the module 304a can have zero or more cross cutting aspects associated with it. In one example, the cross cutting aspects reflect the core Aspect Oriented Programming (AOP) idioms. For example, each aspect can include zero to n advices, policy metadata, and a jointpoint for which it is being invoked. Also, each advice can include zero to n pointcuts and zero to n subscribers. The pointcut is a predicate, i.e., a LINQ expression, evaluated at a jointpoint. (Language Integrated Query (LINQ) is a trade designation for a data query component available from Microsoft, Inc., in the Microsoft.NET Framework that adds native data querying capabilities to .NET languages, such as C-sharp (C#)). Upon pointcut evaluation, all Before, After, and Around advices are invoked.

Figure 4:
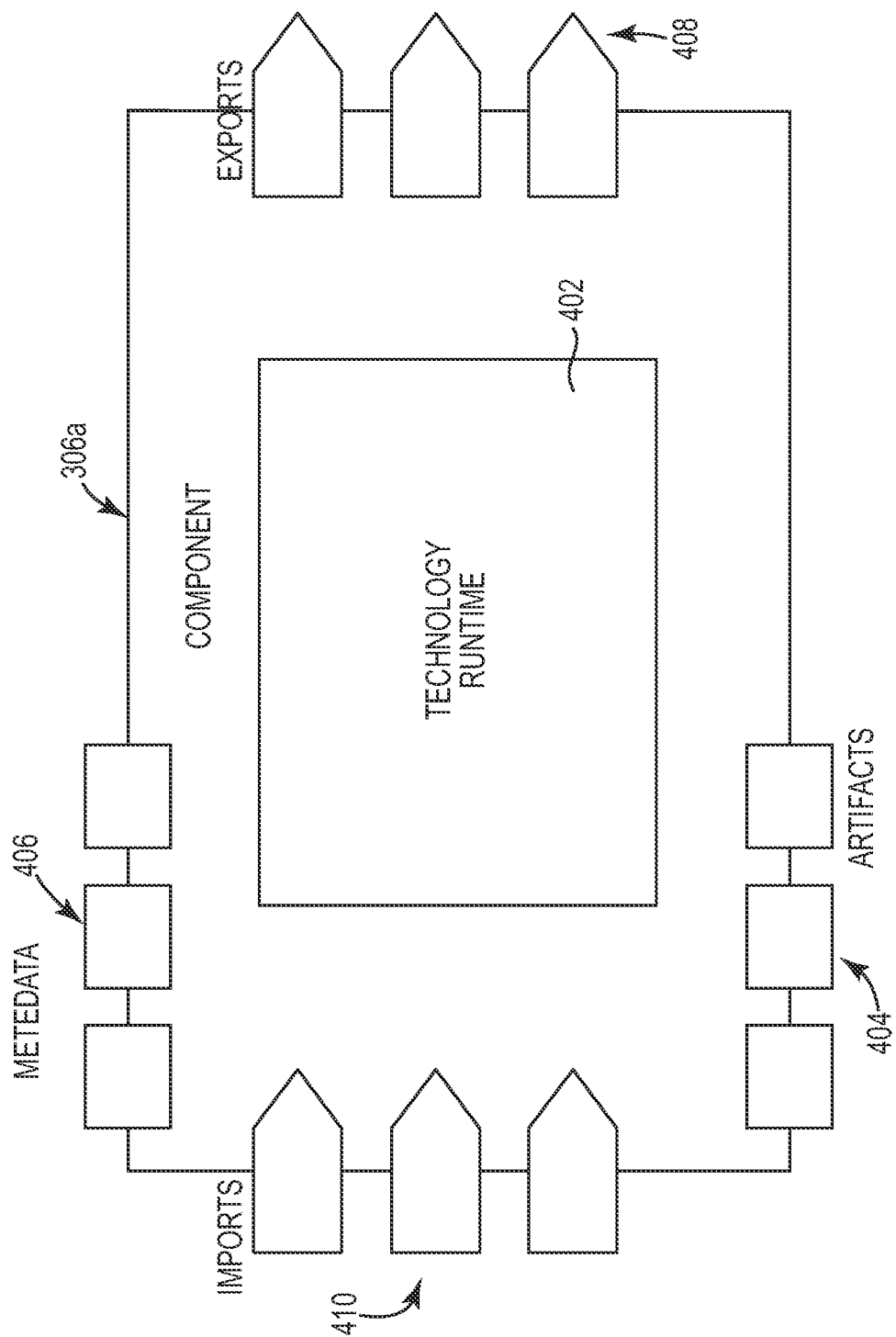
FIG. 4 is a schematic diagram illustrating a component of the example distributed application of FIG. 3.

FIG. 4 illustrates a component, such as component 306a. In the distributed component model 202, a component is a unit of technology encapsulation, extensibility, composition, and reuse. The component 306a includes a technology 402, artifacts 404, metadata 406, exports 408, and imports 410 described below. (Components 306a-306n are distinguishable from a common language runtime object/type or with components in other technologies like component object model or distributed component object model, i.e., "COM/DCOM.")

The component 306a encapsulates a certain technology 402. Such technologies can include, for example, web application technologies or application programming interfaces (APIs) for building connected, service-oriented applications. More than one component type can be developed for a given technology. For example, the application 302 could include a web application component and a service component in the web tier, a code component, a cache component, and a workflow component in the worker tier, and various storage components (such as tables or queues) and an SQL database component in the storage tier. In one example, the component 306a is a wrapper 412 around a set of functionality. This wrapper 412 hides the implementation details of the component yet exposes the functionality and dependencies that can allow loose coupling between service provider and consumers.

The component 306a can include artifacts 404 and define the metadata 406 at runtime. In one example, a component metadata 406 can include a security configuration. A component artifact 404 can include configuration files, binaries, user code, and the like. Component metadata 406 and artifacts 404 can be captured in the application manifest and are made available to the component at runtime.

Components 306a-306n can export, i.e., offer, a set of capabilities and can import, i.e., use, a set of capabilities. A component can export a capability or a service that can be consumed by other components. Also, a component can import a capability or a service for consumption from another component 306n in the application 302 or from an external service. Thus, component exports 408 and component imports 410 are the mechanisms by which the components 306a-306n are stitched together to form the application 302. Stitching may be described at the design stage or can be dynamic in that available exports can be discovered, imported, and used at runtime. In either case, the stitching is a logical expression of a component relationship. The procurement of proxies and the resolution of physical addresses to get two component instances communicating are brokered at runtime.

The component export 408 is a declarative specification of a capability offered at runtime. The component export 408 can also represent an external piece of the application that is not part of the application being modeled. For example, an export 408 can represent a message queuing technology such as one offered under the trade designation of MSMQ available from Microsoft, Inc. or a web service such as one offered under the trade designation of Amazon Web Services (AWS) available from Amazon.com of Seattle, Wash. U.S.A. The component export 408 also includes runtime logic to manufacture proxies that component imports can use. Component exports 408 can be made visible at different scopes such as within the application or externally. Similar to components 306a-306n, component exports 408 are associated with metadata and artifacts. Within the application 302, an export 408 can be identified by a contract and a logical address. The shape and semantics of the contract can be related to the technology 402 used and is opaque to the distributed component model. In one example, component exports 408 are reusable, and independent software vendors can provide the components exports 408 as a library. The component export includes metadata regarding cardinality, which specifies the number of imports acceptable to the component: none, one, or more than one.

A component import 410 is also a declarative specification of a capability consumed by an instance of the component 306a. Component imports 410 are satisfied by component exports from other components that match the criteria of the component import 410, and matching criteria is expressed as a declarative predicate on the component import 410. The predicate is evaluated to match/select from a set of available component exports visible scope of the component requesting the import. In one example, the component 306a will determine a match based on the name of the predicate, but the component can also determine a match on import/export metadata specified by an author of the component 306a or the application 302. The component import 410 typically includes metadata regarding to cardinality, which specifies the number of exports acceptable to the component 206a: none, one, or more than one.

Composition of components in the distributed application 302 can be static or dynamic. In static composition, the relationships between importing and exporting components are established statically and at design time. Static composition is a degenerate case of the more general dynamic composition. In static composition, the importing component includes an import predicate that is set to a known value. The known value does not change at runtime and thus it is possible to determine the matching exporting components statically at design time. This type of composition lends itself to a complete static analysis of the composite application. In dynamic composition, the relationships between importing and exporting components are established dynamically and at run time. Matching of components is established by the distribute composition runtime 204 and includes evaluating import predicates against available exports within the scope or visibility of the importing component.

The distributed component model 202 provides a mechanism for declaratively describing and constructing the distributed application 302 in an application definition. The application definition describes a form of a type system that captures the components 306a-306n within the application 302, the producer-consumer relationships between the components 306a-306n, and any external components or services consumed by components 306a-306n in the application 302. The application definition describes the configuration and constraints of the components as well as component dependencies, interrelationships, and interactions of the distributed application in a declarative manner. The application definition also provides the ability to schematize and extend the compositional structure and metadata, such as metadata 406, in a format/representation agnostic manner. It can be use to validate the compositional structure of the distributed application 302 as well as enforce the composition structure at runtime. Such a representation of compositional structure of an application having complex interactions among a set of distributed components provides the ability to reason over an application lifecycle and can be used to scale the distributed application 302 in a distributed environment.

Figure 5:
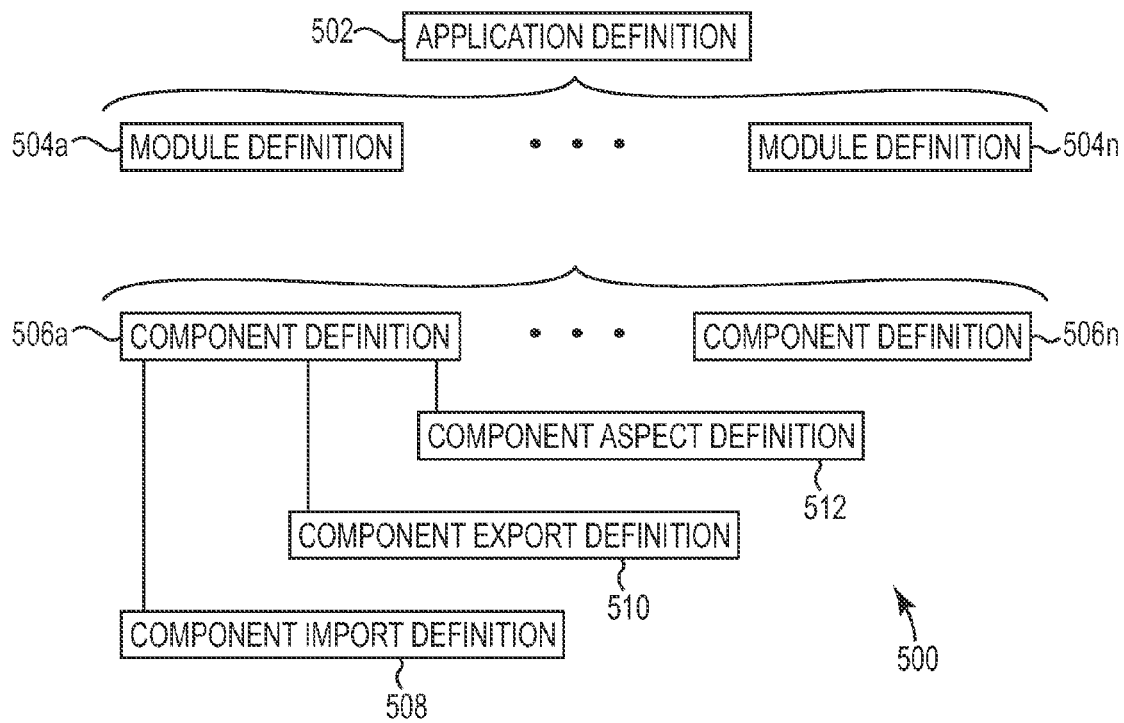
FIG. 5 is a block diagram illustrating an application definition of the distributed application of FIG. 3.

FIG. 5 illustrates an example application definition 500. The application definition 500 includes the constructs of an application definition 502, one or more module definitions 504a-504n, and one or more component definitions 506a-506n for each module definition 504a. The arrangement of the definition constructs resembles an ontology similar to the distributed application schema 300 as a definition tree. The root of the definition tree is the application definition 502. Each of the module definitions 504a-504n corresponds with a particular module of the module 304a-304n. Each component definition 506a-506n corresponds to one of the components of components 306a-306n. Additional constructs are included in the definition tree depending on the particular features of the components. For example, each component using an import includes a component import definition 508, and each component offering an export includes a component export definition 510. Each component that provides an aspect, such as a cross-cutting concern, includes a component aspect definition 512.

The definition constructs include a declarative description of the corresponding application, module, and component. Each definition construct includes associated metadata that further describes the construct. In one example, the component definitions 506a-506n for the application each includes a common set of metadata that describe the aspects of the corresponding component. Similarly, the module definitions 504a-504n for the application each include a common set of metadata that describe the aspects of the corresponding module. The component import definitions 508, the component export definitions 510, and the component aspect definitions 512 can each include common sets of metadata. In addition to the common set of metadata, each component definition can specify component-specific metadata, which is also true for module, component export, component import, and component aspect definitions. In one example, the component-specific metadata is opaque to the distributed component model and is understood by the component 206a and other components that consume it. The application definition 500 in the distributed component model is validated to enforce component interrelationship and metadata. Each definition construct can also specify custom validation logic against the application definition.

The distributed programming model 200 provides developers and enterprises the ability to cost-effectively build, run, and evolve the distributed application 302. Both stateful and stateless components can be developed using familiar technologies, emerging technologies, and custom paradigms for specific domains. The components 306a-306n can be stitched together either statically or dynamically to form the application 302. Cloning, replication, and partitioning are supported within the application 302, as is the ability to make architectural tradeoffs such as among consistency, availability, and tolerance of "partitions" (such as describe in Brewster's CAP Conjecture).

The distributed programming model 200 provides for scalable applications to include the techniques of cloning, replication, and partitioning. Different techniques may apply to different parts of the application 302, which may change over time as the application grows. For example, cloning is a relatively straightforward technique, but in certain technologies it is exclusively suited for stateless components. Replication is currently an effective technique for stateful components, but it can be complex and limited. For example, the amount of state can grow during the life of the application 302 such as in the form of user sessions or cached data that are replicated across machines, or a row-locking scheme in a shared store that becomes the bottleneck to the performance of the application 302. In order to address the issue of growing state, a developer may choose to partition one or more components, which previously involved a costly and difficult re-architecture of the application 302.

In order to avoid a costly re-architecture, the application 302 is initially designed in a distributed component model 202 to support partitioning, which can be used regardless of whether application growth is anticipated. Design patterns and use of a distributed component runtime 204 can make intra-component wiring immune to otherwise invasive changes such as sharding, which is typically know as horizontal partitioning of a database, and component partitioning. Partitioning is made available in the application 302 and then is activated as desired. The application 302 can be readily designed to map the partitions to machines as well. Additionally, the developer can retain flexibility about whether a component 306a or the entire application 302 runs on premise or in a cloud-computing environment. As the costs of infrastructure change over time, the architecture of the application 302 can naturally evolve to take advantage of the relative cost changes.

A component 306a is "partitioned" when a given job belongs to only one part and can be performed only on the node that owns the part. The total job responsibilities of the component 306a are split into multiple parts and each node that hosts the component owns one or more parts. This pattern, when applied to stateful services, overcomes the limitation that exists for "component cloning."

Partitions can be made to be mutually exclusive of one another. Mutually exclusive partitions do not overlap one another. The following example provides an illustration as to correct and incorrect partitioning of a three digit "Order-Id" range:
Correct: {100-250}, {251-500}, {501-750}, {751-999}
Incorrect: {100-400}, {200-700}, {600-999}
In this example, the partitions do not include have duplicate items, and partition is a part of a whole and hence unique.

A partition can also be a unit of load balancing. In this respect, partitions become more efficient as they approach equal load. The following example provides an illustration as to an advantageous and disadvantageous partitioning of a consumer credit score range given that most credit scores are between 600 and 750.
Advantageous: {300-500}, {501-600}, {601-650}, {651-700}, {701-750}, {751-850}
Disadvantageous: {300-400}, {401-500}, {501-600}, {601-700}, {701-850}
In this example, the advantageous partitioning attempts to balance the size of the loads across all partitions and avoid a condition where the size of load size is too big or too small compared to other loads. In the disadvantageous partitioning, the sizes of the load may undesirably impact an attempt move a partition from one machine to the other if the machines are configured differently. In this respect, the load size of the partition with the biggest load is preferably smaller than the maximum load a node can handle.

Additionally, partitions can be made atomic. Each atomic partition lives and fails as a unit. Each atomic partition is a single point of failure unless backups such as replicas are maintained using a process called replication. Under replication, a primary partition can include one or more replicas, such as secondary or tertiary replicas that are configured to assume the role of a primary partition in case the primary partition fails. In one example, the primary and its replicas are each maintained on separate nodes or machines, which helps ensure the high availability of the component.

The clients address the service with a logical address. In one example, the client side will provide an address resolution from logical address to physical address on the client side at runtime. In some circumstances, this can be avoided on messages where a partitioning key is part of the message. The client requests the naming service for the routing table for the given logical address and then looks up the physical address. The partitioning scheme and context are defined on the server and are brought to the client side as part of routing table. For example, the client sends a message to the service with a request for "Hotel Search Information." The service will respond with a key from a key generation function that asks for a city. The client provides a partitioning key with "Seattle." The service can produce a list from the portioning function with "1" represents Seattle and "2" represents London. The partitioning ID is set to "1." The look up routing table will use the partitioning ID to find the correct address of the desired service.

Each module 304a can be a logical grouping of related components 306a-306n for the purposes of co-location and partitioning. Components 306a-306b grouped together within a module can run within the same application domain. For example, two or more components 306a-306n can be co-located if they abide by the same partitioning scheme. In a partitioned module, each part is independent of the others and hence receives its own application domain within which the set of co-partitioned components for the corresponding part will run. The components 306a-306n within a module, such as module 304a, can communicate via direct method invocations. Across modules 304a-304n, components communicate by sending messages. A module type can correspond to the capability of the host. For example, a stateless component, such as a web role, is hosted in a stateless module. Execution environments for modules include web and worker roles for stateless components and a fabric role for stateful components.

During runtime, the distributed programming model 200 can monitor the application 302 to diagnose and repair issues as well as meter the use of the components 306a-306n. The distributed component model 202 can elastically allocate and reclaim resources to support a fluctuating demand. Further, the distributed programming model 200 provides for the ability to later partition the application 302, co-locate partitioned components 306a-306n, change a mapping of partitions to a physical infrastructure, and shard a database without costly re-architecture.

In one example, an application fabric available under the trade designation of AppFabric can run on premise, such as a server operating system available under the trade designation of Windows Server, and in a cloud environment having a cloud computing or cloud services operating system available under the trade designation Windows Azure, all available from Microsoft, Inc., allowing entire applications (or components within them) to be deployed to either environment or a combination the two. Web roles, workflow, and the like can be built using developer tools such as those sold under the trade designations of Windows Communication Foundation (WCF) and Windows Workflow Foundation (WF) available from Microsoft, Inc.

Designers of distributed applications wrestle with tradeoffs. Central to this struggle is Brewer's CAP Conjecture, which states in part that a system cannot at once be consistent, available, and partition-tolerant but selects two of these desirable characteristics. (Note that the concept of a "partition" in the context of the CAP conjecture is different than the idea of "component partitioning" which is described in this document as a technique for achieving scalability.) Stateless components and stateful components often use different techniques to scale. As alluded to above, components that do not manage state can be straightforwardly cloned in order to achieve scalability. Components that do manage state are harder to scale, and stateful components are not cloned because doing so would violate the current principles of state consistency. Typical application designs tend to externalize the state of such a component and scale the state differently than the stateless logic, which at times can be a good approach. More frequently, however, there are benefits to co-locate state, rather to externalize state, with the logic that manipulates that state, i.e., a stateful component.

In a (truly) stateless component, the output of a request to the component is purely a function of the input. For example, the following component sets forth a stateless web service with various calculator methods:

```
public interface IStatelessCalculator
{
    int Add(int x, int y); // returns x + y
    int Subtract(int x, int y); // returns x - y
    ...
}
```

Stateless components like this calculator service are rarely written in this fashion.

In stateful components, however, the output of a request to the component is a function of the input, plus some data that was materialized in the context of previous requests. For example, a web service with various calculator methods is stateful if it keeps track of a "current value" much like a hand-held calculator does:

```
public interface IStatefulCalculator
{
    void Enter(int x); // sets 'current value' to x
    void Clear( ); // like calling Enter(0);
    int Add(int x); // 'current value' += x, returns new value
    int Subtract(int x); // 'current value' -= x, returns new value
    ...
}
```

The stateful calculator can be a singleton, or, more usefully, can support many instances. In the latter case, each request will indicate which calculator instance the request is targeting, either explicitly (such as with a "CalculatorId" parameter of each operation) or using some other mechanism tied to the broader technical design of the service (e.g. a "CalculatorId" value in a request message header).

Stateless components can be cloned to achieve scalability and high availability. But providing scalability and high availability for a stateful component does not come so easily. A previous technique of simulated cloning for stateful components includes externalizing state of the stateful component. This technique allows the component logic to be stateless, and therefore capable of being cloned. Despite the apparent similarity, there are very real differences between truly stateless components and "components with stateless logic, which externalize their state." For example, when handling a request, the stateless component logic retrieves previously externalized state using a key provided within the request:

```
public class StatefulCalculator : IStatefulCalculator
{
    public int Add(int x)
    {
        long calculatorId = . . . // obtain value from request message
            header
        int currentValue = (int) GetDurableValue(calculatorId,
            "CurrentValue");
        return currentValue + x;
    }
    ...
}
```

Although this development technique is viable and widely practiced, it has costs in terms of efficiency. First, the method used to author the component is unnatural. In the example above, durable data is stored and retrieved using application programming interfaces. In an example to simplify some of the complexity in this entails, sessions, as in ASP.NET, remove the prerequisite for the "CalculatorId" parameter to the "GetDurableValue" method in the code snippet above because there is an implicit session ID that scopes the externalized data available to the current request handling logic. Even while it is possible to simplify over some of the complexity, the opaqueness of the data flow of the component logic, especially across multiple operations, cannot be avoided. Exacerbating the problem, the overall (cross-request) control flow (request sequencing, branching, looping, parallelism) of a stateful component is difficult to express succinctly and readably using this approach. So control flow is also opaque.

Second, this technique is error-prone and susceptible to subtle bugs in code. For example, the code above returned the correct result, but it does not set the durable state of the current calculator instance to "currentValue+x" in order to handle multiple instances.

Third, the medium for storing the externalized component state itself must be designed for scale and high availability. So the problem of avoiding the limitation state is not really solved, just moved to a different part of the application architecture. In this technique, the state will typically need to be replicated eventually, which brings with it the limitations of the CAP Conjecture.

Therefore, regardless of whether a developer chooses to externalize component state or embody the state in the component logic itself, such as in Windows Work Flow, the framework will eventually partition the state in order to scale. In fact, even a component that is stateless with respect to inbound requests, i.e. there are no sessions, can be usefully partitioned if it uses external data (not scoped to a user request) that can be cached in a partitioned manner as part of that component.

In order to address the problems of the current techniques, the programming model provides a scalability tool to design stateful components or applications to be capable of being partitioned, or partitionable, from the outset. The scalability tool also allows for application logic to be expressed in a natural way, which makes code easier to write and enhance than in the techniques described above. A simple illustrative example of a partitionable stateful component is a version of the stateful calculator service that keeps the "currentValue" in a member variable, where it can be naturally accessed by all of the calculator's methods:

```
public class StatefulCalculator : IStatefulCalculator
{
    [Replicable]
    int currentValue; // will be replicated
    [ReplicateOnExit]
    public int Add(int x)
    {
        this.currentValue += x;
        return currentValue;
    }
    ...
}
```

The programming model also provides other pathways to explore new models for stateful components. As another example, component logic can explicitly manipulate distributed collections.

As a different example includes stateful program instances, i.e., where the program instance itself is the state, (such as in a developer tool such as Windows Workflow Foundation) banishes control flow opaqueness. This can be expressed as a textual representation or other representations such as XAML and the like. An example of a textual representation can appear as:

```
int currentValue = 0;
bool done = false;
// the instance state is replicated at idle points
while (!done)
{
  parallel
  {
    receive (Exit( ))
    {
      done = true;
    }
    receive (Add(int x))
    {
      currentValue += x;
      return currentValue;
    }
    receive (Subtract(int x))
    {
      currentValue -= x;
      return currentValue;
    }
  }
}
```

Thus, the programming model 200 can provide application developers with choices for developing stateful components that can be built naturally, without sacrificing scalability.

The following provides an example application programming interface constructed to provide scalability tools:

```
publicabstractclassStatefulComponent<T> : StatefulComponent, IRequestHandlerProvider, IServiceProvider, IRequestHandler
{
// Methods
protectedIAsyncResultBeginCreateState(Partition partition, T state, string version, AsyncCallback callback,
object asyncCallbackObject);
protectedIAsyncResultBeginDeleteState(Partition partition, T state, string version, AsyncCallback callback,
object asyncCallbackObject);
protectedIAsyncResultBeginUpdateState(Partition partition, T state, string version, AsyncCallback callback, object asyncCallbackObject);
protectedReplicationResultEndCreateState(IAsyncResult result);
protectedReplicationResultEndDeleteState(IAsyncResult result);
protectedReplicationResultEndUpdateState(IAsyncResult result);
protectedvirtualCollection<T>OnCopyState(StatefulComponentExecutionContext executionContext);
protectedvirtualvoidOnCreateState(StatefulComponentExecutionContext executionContext, Partition ownerPartition, string version, T state);
protectedvirtualvoidOnDeleteState(StatefulComponentExecutionContext executionContext, Partition ownerPartition, string version, T state);
protectedoverridevoidOnLoad(StatefulComponentExecutionContext executionContext);
protectedoverridevoidOnPartitionChanged(StatefulComponentExecutionContext executionContext, bool isPartitionOwned, Partition partition);
protectedvirtualvoidOnProcessRequestAsync(StatefulComponentExecutionContext executionContext, StateChangeRequestType requestType, string version, T state, Action<HttpStatusCode, string, T, ErrorResource> callback);
protectedvirtualvoidOnPurgeState(StatefulComponentExecutionContext executionContext, Partition ownerPartition);
protectedvirtualvoidOnReplaceState(StatefulComponentExecutionContext executionContext, Partition ownerPartition, Collection<T> stateSnapshot);
protectedoverridevoidOnStart(StatefulComponentExecutionContext executionContext);
protectedoverridevoidOnStop(StatefulComponentExecutionContext executionContext);
protectedoverridevoidOnUnload(StatefulComponentExecutionContext executionContext);
protectedvirtualvoidOnUpdateState(StatefulComponentExecutionContext executionContext, Partition ownerPartition, string version, T state);
}
publicclassStatefulComponent : Component, IStatefulComponent
{
// Methods
publicstaticstringGetPartitionKey<TState>(TState state);
protectedvirtualvoidOnFault(StatefulComponentExecutionContext executionContext);
protectedvirtualvoidOnLoad(StatefulComponentExecutionContext executionContext);
protectedvirtualvoidOnPartitionChanged(StatefulComponentExecutionContext executionContext, bool isPartitionOwned, Partition partition);
protectedvirtualvoidOnStart(StatefulComponentExecutionContext executionContext);
protectedvirtualvoidOnStop(StatefulComponentExecutionContext executionContext);
protectedvirtualvoidOnUnload(StatefulComponentExecutionContext executionContext);
}
publicinterfaceIStatefulComponent
{
// Methods
IEnumerable<ReplicationOperation>GetCopyOperations(StatefulComponentExecutionContext executionContext, long maxSequenceNumber);
voidOnApplyOperation(StatefulComponentExecutionContext executionContext, Partition ownerPartition, ReplicationOperation operation);
voidOnClearOperations(StatefulComponentExecutionContext executionContext);
voidOnOperationDataLost(StatefulComponentExecutionContext executionContext, long epoch);
voidOnOperationReplicated(StatefulComponentExecutionContext executionContext, ReplicationOpera-
tion
```

```
operation);
voidOnPartitionChanged(StatefulComponentExecutionContext executionContext, bool isPartition-
Owned);
voidOnReplicaRoleChanged(StatefulComponentExecutionContext executionContext, ReplicaRole
oldRole,
ReplicaRole newRole);
// Properties
stringName { get; }
}
```

In still a further example, Object-relational mapping can be integrated with stateful components. An Object-relational mapping (often referred to as ORM, O/RM, or O/R mapping) is a programming technique for converting data between incompatible type systems in object-oriented programming languages. An example Object-relational mapping software is sold under the trade designations "Entity Framework" or "ADO.NET Entity Framework" available from Microsoft for the .NET Framework, which uses object contexts. The ObjectContext class is the primary class for interacting with data as objects that are instances of entity types that are defined in a conceptual model. An instance of the ObjectContext class encapsulates the following: connection to the database such as in the form of an EntityConnection object; metadata that describes the model such as in the form of a MetadataWorkspace object; and an ObjectStateManager object that manages objects persisted in the cache. When the object layer that represents a conceptual model is generated by the Entity Data Model tools, the class that represents the EntityContainer for the model is derived from the ObjectContext. ObjectContext provides the Object-relational mapping against an SQL database. ObjectContext is also used in tools such as Windows Control Flow (WCF) Data Services. In one example, each "Windows Control Flow Data Service" instance has an associated ObjectContext.

In the example, each ObjectContext is treated as an item in the per partition dictionary kept by the stateful component. The stateful component in the example can disregard whether the value in the dictionary is of type ObjectContext. The method simply inherits from ObjectContext and wire-up Replicate( ) methods in its SaveChanges and can replicate the state inside the context using System.Data as follows:

```
public abstract class ReplicableObjectContext : ObjectContext
{
public ReplicableObjectContext (string replicationBatchIdentifier)
{ }
//TODO: override other base class constructors and explicitly take replicationBatchIdentifier
        public string ReplicationBatchIdentifier
        {
     get;
        }
        publicoverride int SaveChanges(SaveOptions options)
        {
            //look for changed entities
            Var modifiedEntities = ObjectStateManager.GetObjectStateEntries(EntityState.Modified |
EntityStateAdded | EntityState.Deleted);
            //TODO: var replicableEntities = loop over entities and find.Entity that has [Replicable] attribute
on it.
            StatefulComponent sc = this.ExecutingComponent as StatefulComponent;
            sc.Replicate(this.replicationBatchIdentifier, replicableEntities);
        }
        public IAsyncResult BeginSaveChanges(SaveOptions options, ...)
        {
        }
        public int EndSaveChanges(IAsyncResult result)
        {
        }
}
```

In distributed applications created using the distributed component model 202, the distributed component runtime 204 is used to broker component interactions. Interactions between components in the distributed application 302 are virtualized with logical addresses that are mapped to physical addresses with the distributed component runtime 204. The distributed component runtime 204 arbitrates the procurement of physical addresses from the hosting environment, maintains a logical to physical address mapping, and performs the logical to physical translation at runtime. Composition of components is agnostic of the locality of the importing and exporting components. In the distributed component model 202, an importing component does not know the physical address of the exporting component. The distributed component runtime 204 provides the logical to physical translation of addresses at application runtime when these interactions materialize. Logical addresses are assigned to component exports and are used to reference components in the application 302. Distributed component runtime 204 also addresses and routes to the appropriate partition.

In one example, a distributed application manifest provides the distributed application model 206 in definition constructs expressing the component configurations and their interrelationships to each other and interactions in a technology and format agnostic manner. The manifest is a serialized form of the application definition 500 and captures the entire structure of the application 302. In one example, the manifest is format agnostic and can be serialized in a variety of formats, which can include scripting languages such as extensible markup language (XML), extensible application markup language (XAML), JavaScript object notation (JSON), or binary JSON (BSON) and many others now know or yet to be created. The following example distributed application manifest is serialized in JSON:

606 of "3," and thus three instances of the stateless module, i.e., instances 608a, 608b, 608c, are created at runtime. For example, the module definition 604 can include metadata regarding "Enable High Availability," which indicates if the module is to be made highly available. Additionally, the module definition can include metadata regarding "Instance Count Hint," which specifies the number of instances of the stateless modules 608a-608n to create at runtime.

```
{
"Name": "MyApp",
"Id": "622BN4TFQB3UHFEERJGFXPVX4A",
"BaseUri": http://MyApp.cloudapp.net/,
"SelfLink": ". . .",
"Version": "1.0.0.100" ,
"References": [
    {"Type": "DistributedList", . . .}, {"Type":"TaskScheduler",. . . }, {"Type":"CloudQueue", . . .},
        {"Type": "WCFService", . . . } ],
"ModuleDefinitions":
[
    {"Name": "MyWebModule", Type" : "Web", "InstanceCountHint": 2, "Components": [ { . . . }] },
    {"Name": "MidTierModule", "Type" : "Stateful", "InstanceCountHint": 2,
    "IsolationLevel": "Process", "MachineSize": "Large",
    "PartitionPolicy": { "Type": "RangePartitionPolicy", "Keys": [ "A-G", "H-M","N-Z"] },
        "ReplicaCountHint": 2, "ReplicationFormat": "JSON", "WriteQuorum": 1,
        "Components":
        [
            {"Name": "MovieProcessor", "ModuleAffinity": "Stateful", . . .
            "Imports":
            [
                {"Name": "DistributedList", "Cardinality": "ExactlyOne", "InstancingPolicy":
                    "Pooled", "Constraint": { . . . } } },
                {"Name": "NewMovies","Cardinality": "AtleastOne","InstancingPolicy":
                    "Singleton","Constraint": { . . . } } },
                {"Name": "MovieService","Cardinality": "AtleastOne","InstancingPolicy":
                    "Singleton","Constraint": { . . . } } },
                {"Name": "TaskScheduler","Cardinality": "AtleastOne","InstancingPolicy":
                    "Singleton","Constraint": { . . . } } },
            ],
        }
    ]
}
. . .
]
. . .
}
```

The manifest includes the application definition 502, the module definitions 504a-504n, component definitions 506a-506n, component exports 508, component imports 510, and component aspect definitionss 512. In the example, the module definitions 504a-504n include metadata on instances, partitions, and replicas. A stateless module definition can include a declaratively defined instance count that control the number of module instances and describes the scalability and high availability (often referred to as "HA") characteristics of a stateless module and its corresponding components. A stateful module definition can include a declaratively defined instance count, a partition policy, and a replica count to describe the scalability and high availability characteristics of a stateful module and its corresponding components. In order to evolve or scale the application, a developer adjusts the counts and policies within the metadata of the module definition to a selected amount.

Figure 6:
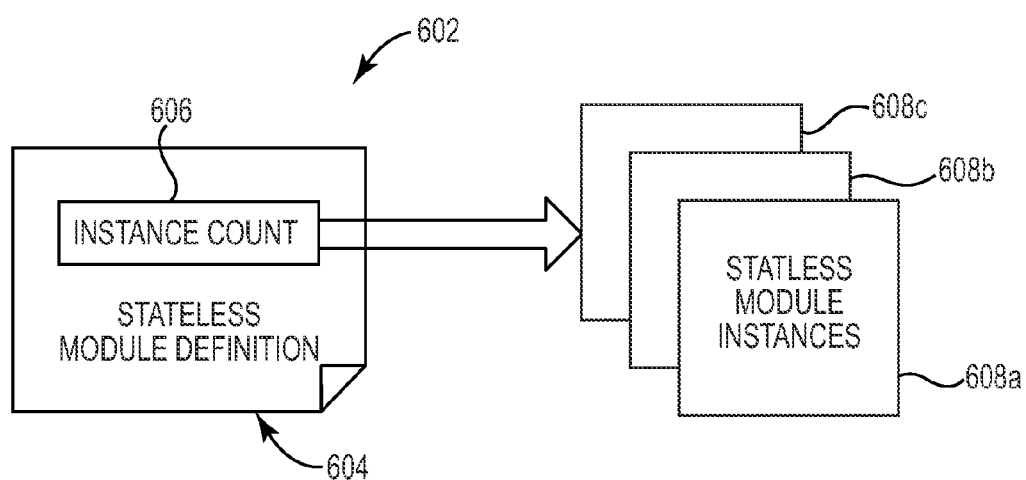
FIG. 6 is a block diagram illustrating scale out and high availability of a stateless module.
Figure 7:
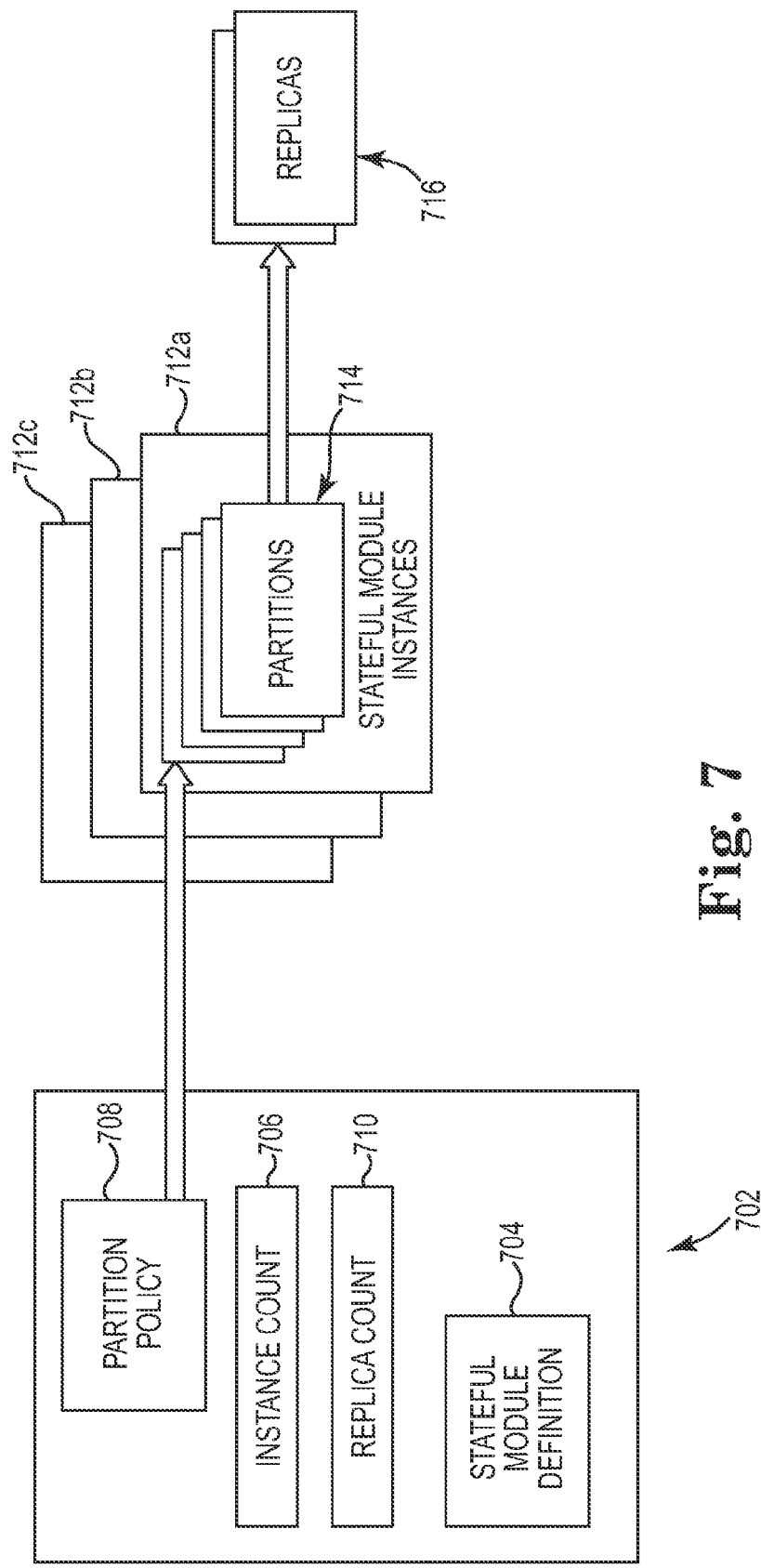
FIG. 7 is a block diagram illustrating scale out and high availability of a stateful module.

FIG. 6 illustrates scale out and high availability of a stateless module 602, which can correspond with module 304a for this example. The corresponding module definition 604 of the stateless module 602 includes an instance count 606 in the metadata. The instance count 606 controls the number of module instances, i.e., the scale out and high availability characteristics of the stateless module 602. The example module definition 604 includes an instance count FIG. 7 illustrates scale out and high availability of a stateful module 702, which can correspond with module 304n for this example. The corresponding module definition 704 of the stateful module 702 includes an instance count 706, a partition policy 708, and a replica count 710 in the metadata. The instance count 706 controls the number of module instances and thus scale out. The partition policy 708 controls the number of partitions assigned to a given module instance. The replica count 710 controls the high availability and determines the number of replicas 716 to each partition. The example module definition 704 includes an instance count 706 of "3," i.e., instances 712a, 712b, 712c. The example partition policy 708 assigns four partitions 714 to each instance 712a, 712b, 712c, and the example replica count assigns two replicas 716 to each partition. The instances 712a, 712b, 712c, partitions 714, and replicas 716 are created at runtime.

Figure 8:
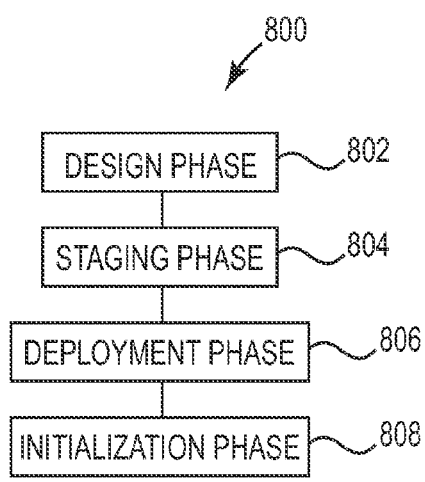
FIG. 8 is a block diagram illustrating an example application lifecycle of the distributed application of FIG. 2.

FIG. 8 illustrates how the application definition 500 is created and is used through an application lifecycle 800. The distributed application 302 is constructed during the application design phase at 802. The distributed application 302 is constructed as per the schema 300 prescribed by the distributed component model. The output of the design phase 802 is a serialized application package that contains the application manifest and the artifacts that make up the different components 306a-306n. The application package is staged in an application fabric repository during an application staging phase at 804. The application package is posted to an end point on which an application farm fabric manager is listening. Once the distributed application 302 is posted, the application fabric farm manager shreds the application package. The application farm manager will access the artifacts for each component 306a-306n according to the application manifest and stores them in the application fabric repository. The application farm manager will also expose the application hierarchy as a Representative State Transfer (REST) resource that can be accessed by other applications or by the component code themselves. The distributed application 302 stored in the application fabric repository is deployed to a host farm during the deployment phase at 806. In order to deploy the distributed application 302 to the host farm, the farm manager will look at the application manifest and deploy the appropriate modules 304a-304n within the application to a corresponding set of nodes within the host farm. During an application initialization phase at 608, the various different modules 304a-304n deployed to the nodes are loaded into the host process and the components 306a-306n within the modules 304a-304n start executing. If the component is a service, the component will create the end point and start listening on the end point.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of authoring and executing stateful components for a distributed application, the method comprising:
    declaratively defining an application schema for the distributed application including a plurality of distributed modules, wherein each module hosts a set of stateful components in a physical tier of a distributed environment having logic to manipulate state, and wherein the application schema includes a serialized and programmable module definition corresponding with each module, wherein each module definition includes declaratively defined associated metadata to describe the aspects of the module; and
    providing runtime support of selectively partitioning the stateful components into scalable partitions, each partition includes a state of the partition of the stateful component co-located with logic to manipulate state without externalizing state from state logic, in response to adjustably programming the associated metadata to declaratively define an amount of module instances, an amount of partitions assigned to each module instance, and an amount of replicas for each partition to be created at runtime.

2. The method of claim 1 wherein the partitions are atomic.

3. The method of claim 1 wherein the partitions are mutually exclusive.

4. The method of claim 1 wherein the partitions are units of load balancing.

5. The method of claim 1 wherein a partition includes a backup replica.

6. The method of claim 5 wherein the backup replica is located on another physical tier.

7. The method of claim 1 wherein the stateful components provide a service, and clients address the service with a logical address.

8. The method of claim 7 wherein the logical address is resolved into a physical address at the client at runtime.

9. The method of claim 1 wherein control flow opaqueness occurs when state is externalized.

10. The method of claim 1 wherein the partitions are independent of each other and each partition receives a corresponding application domain.

11. The method of claim 1 wherein the application schema includes stateless components, wherein the stateless components are scaled with cloning.

12. The method of claim 1 wherein the stateful components are exclusive of components that externalize state.

13. The method of claim 12 wherein each statelful component includes an output of a request to the component that is a function of an input and data materialized in context of a previous request to the component.

14. The method of claim 1 wherein object-relational mapping is integrated with the stateful components.

15. The method of claim 1 comprising:
    banishing control flow opaqueness of component logic in each of the stateful components.

16. A computer readable storage medium, which does not include transitory propagating signals, storing computer executable instructions for controlling a computing device to perform a method comprising:
    providing an extensible framework for authoring and executing stateful components for a distributed application, wherein the providing comprises:
        declaratively defining abstractions in an application schema for the distributed application including a plurality of distributed modules, wherein each module hosts a set of stateful components in a physical tier of a distributed environment having logic to manipulate state, and wherein the application schema includes a serialized and programmable module definition corresponding with each module, wherein each module definition includes declaratively defined associated metadata to describe the aspects of the module; and
        providing runtime support of selectively partitioning the stateful components into scalable partitions, each partition includes a state of the partition of the stateful component co-located with logic to manipulate state without externalizing state from state logic, in response to adjustably programming the associated metadata to declaratively define an amount of module instances, an amount of partitions assigned to each module instance, and an amount of replicas for each partition to be created at runtime.

17. The computer readable storage medium of claim 16 wherein the plurality of distributed modules provide partition-aware routing.

18. The computer readable storage medium of claim 17 wherein the distributed application includes metadata regarding instance count.

19. The computer readable storage medium of claim 18 wherein the distributed application includes metadata regarding a partitioning policy and a replica count.

20. A method of authoring and executing stateful components for a distributed application, the method comprising:

providing an extensible framework for authoring and executing stateful components for a distributed application, wherein the providing comprises:

declaratively defining abstractions in an application schema for the distributed application including a plurality of distributed modules, wherein each module hosts a set of stateful components co-located in a physical tier of a distributed environment having logic to manipulate state, and wherein the application schema includes a serialized and programmable module definition corresponding with each module, wherein each module definition includes declaratively defined associated metadata to describe the aspects of the module; and providing runtime support of selectively partitioning the stateful components into scalable partitions according to definition constructs corresponding with the distributed modules, each partition includes a state of the partition of the stateful component co-located with logic to manipulate state without externalizing state from state logic, in response to adjustably programming the associated metadata to declaratively define an amount of module instances, an amount of partitions assigned to each module instance, and an amount of replicas for each partition to be created at runtime.

21. A system for authoring and executing stateful components for a disturbed application, the system comprising:

a computing device including a processor and a memory configured to:

declaratively define an application schema for the distributed application including a plurality of distributed modules, each module hosts a set of stateful components in a physical tier of a distributed environment having logic to manipulate state, the application schema includes a serialized and programmable module definition corresponding with each module, each module definition includes declaratively defined associated metadata to described the aspects of the module; and provide runtime support of selectively partitioning the stateful components into scalable partitions, each partition includes a state of the partition of the stateful component co-located with logic to manipulate state without externalizing state from state logic, in response to adjustably programming the associated metadata to declaratively define an amount of module instances, an amount of partitions assigned to each module instance, and an amount of replicas for each partition to be created at runtime.

22. The system of claim 21 wherein the plurality of distributed modules provide partition-aware routing.

23. The system of claim 21 wherein computing device is configured to:

address the stateful components with a logical address, the logical address is resolved into a physical address at runtime.

24. The system of claim 21 wherein the application schema includes stateless components and the stateless components are scaled with cloning.

25. The system of claim 21 wherein the partitions are independent of each other and each partition receives a corresponding application domain.

\* \* \* \* \*